May 7, 1929.  S. G. STUCKEY  1,711,818
IMPACT CONTROL FOR GLASS FEEDERS AND FORMING
MACHINES, AND METHOD OF OPERATING THE SAME
Filed Dec. 18, 1926  7 Sheets-Sheet 1
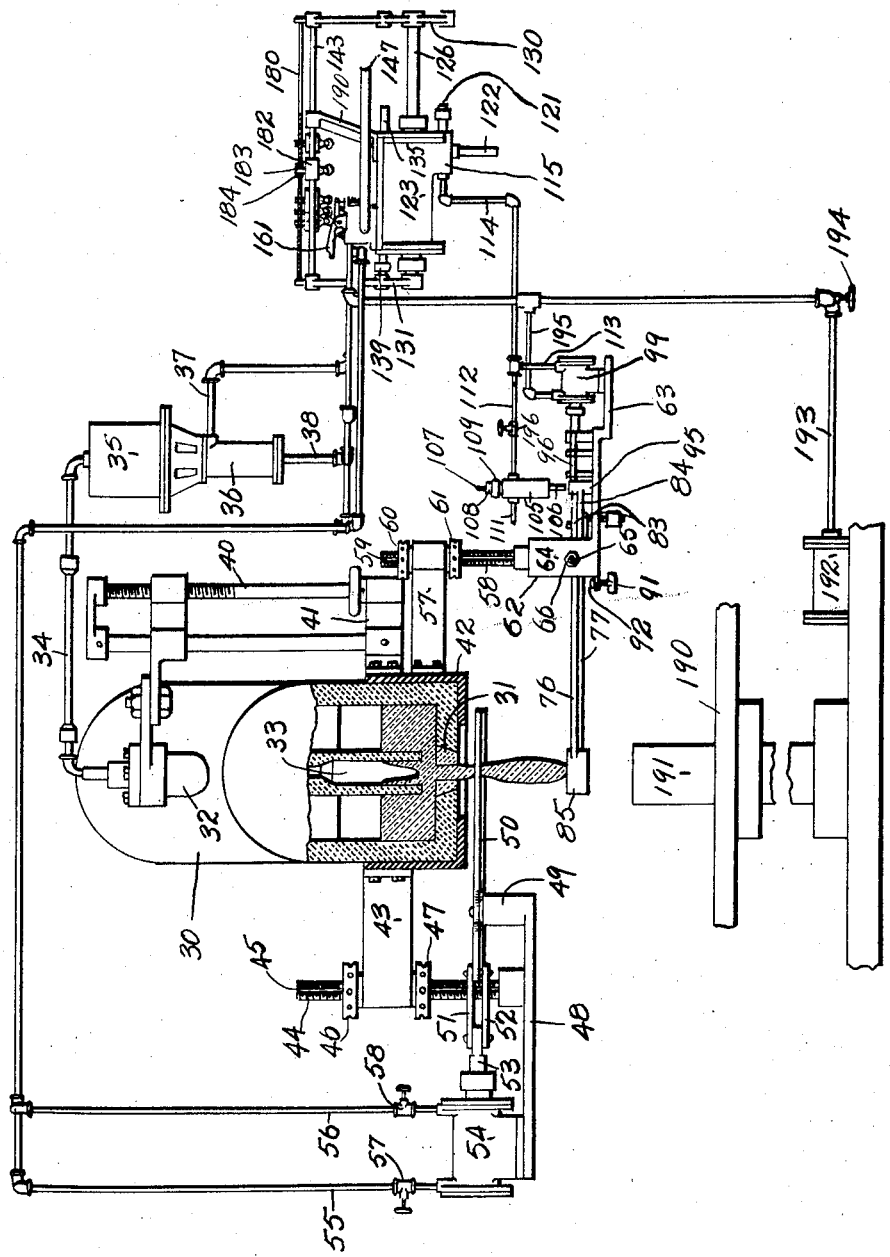
INVENTOR
SAMUEL G. STUCKEY
By Edward E. Logan
ATTY.

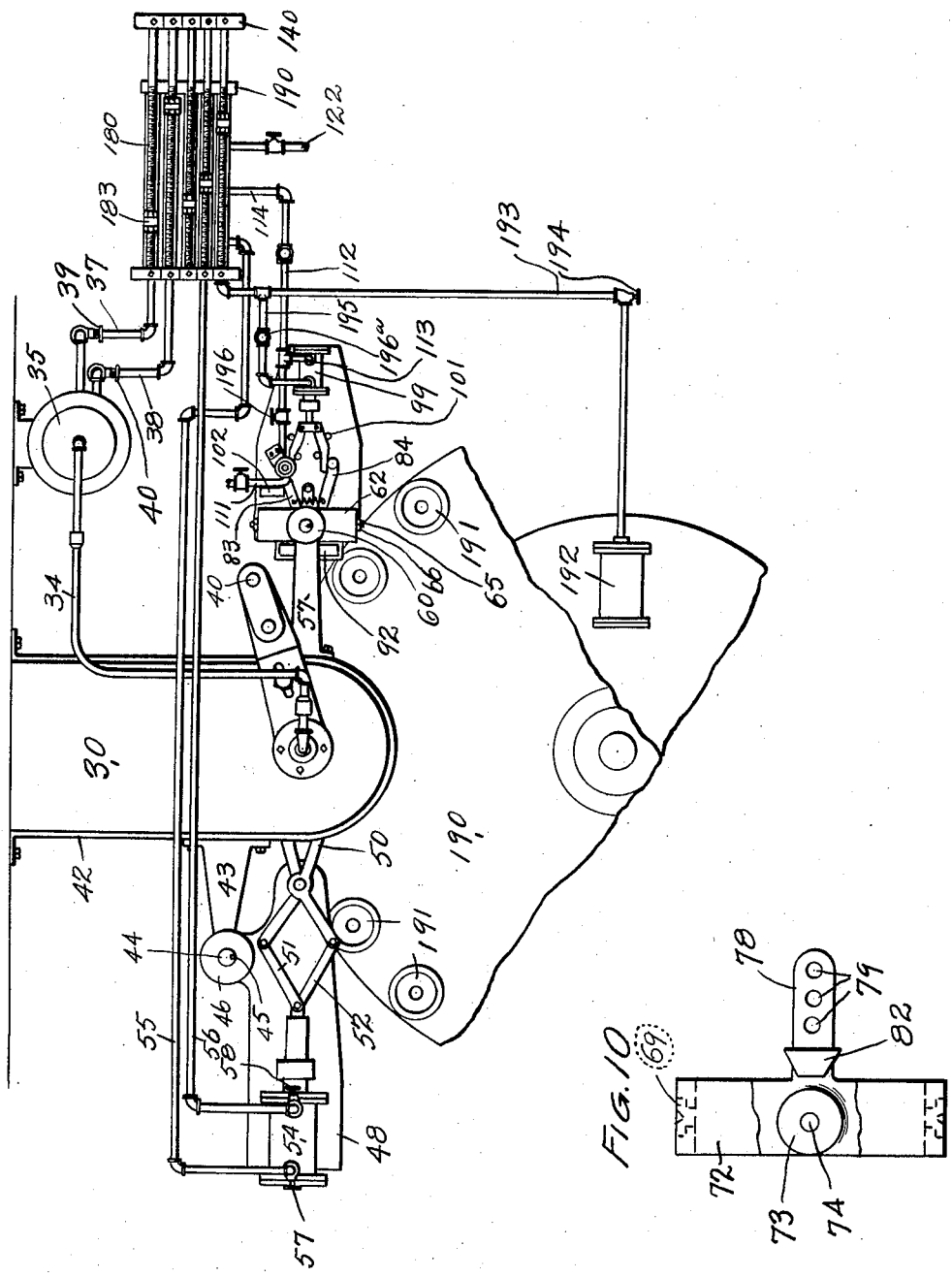

May 7, 1929.  S. G. STUCKEY  1,711,818
IMPACT CONTROL FOR GLASS FEEDERS AND FORMING
MACHINES, AND METHOD OF OPERATING THE SAME
Filed Dec. 18, 1926   7 Sheets-Sheet 3
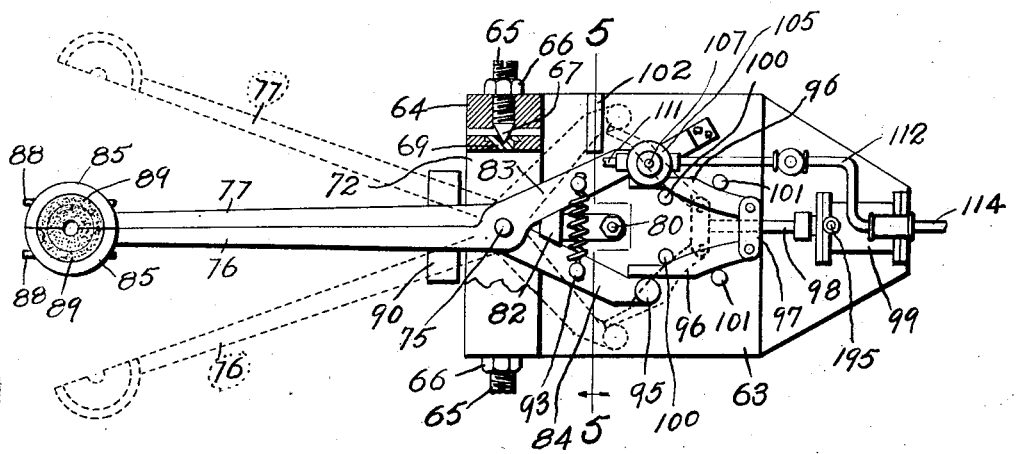
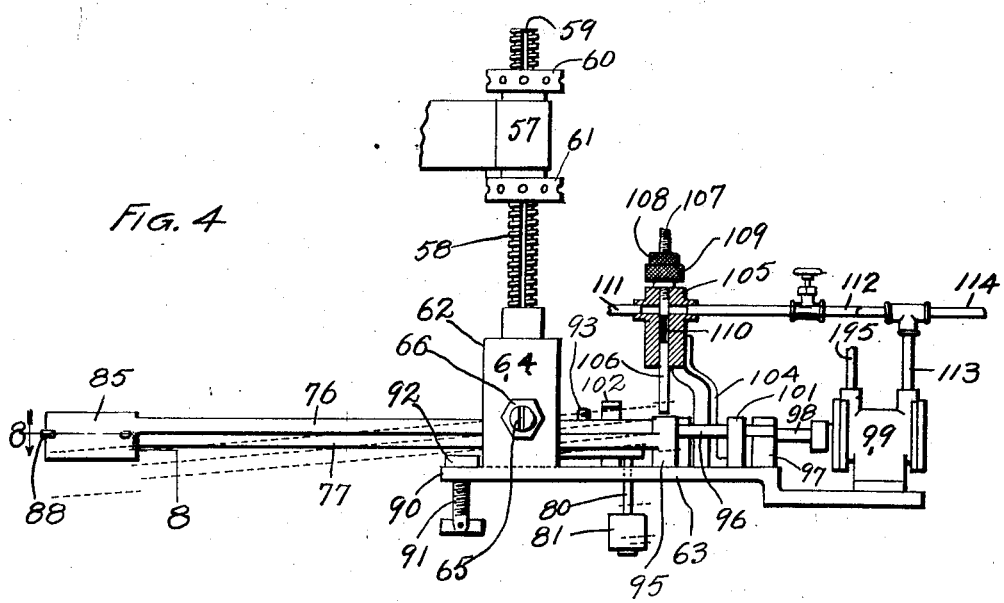
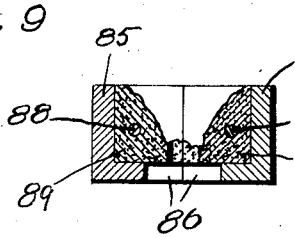
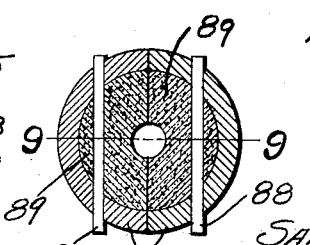
INVENTOR
SAMUEL G. STUCKEY
ATTY.

May 7, 1929.   S. G. STUCKEY   1,711,818
IMPACT CONTROL FOR GLASS FEEDERS AND FORMING
MACHINES, AND METHOD OF OPERATING THE SAME
Filed Dec. 18, 1926   7 Sheets-Sheet 4
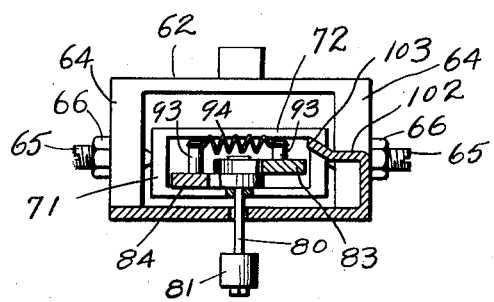
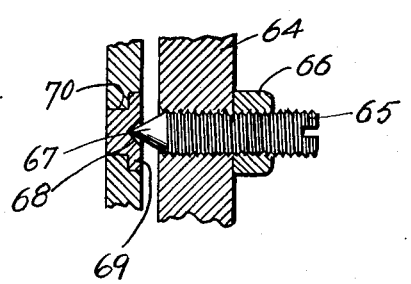
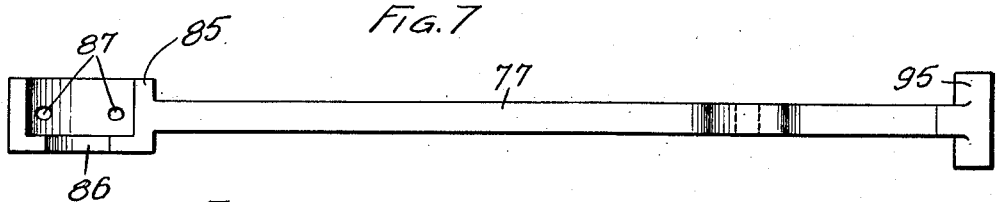
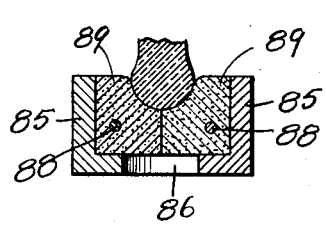
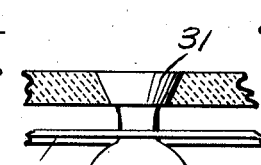
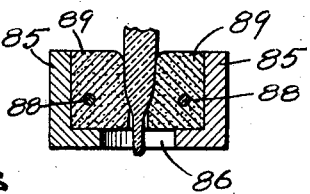
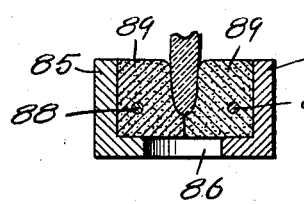
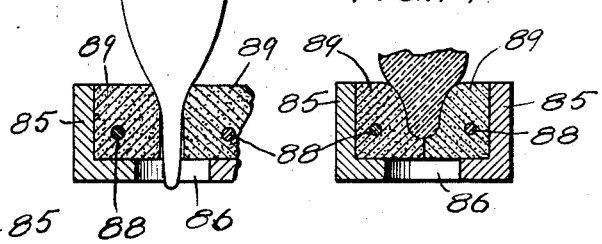
INVENTOR
SAMUEL G. STUCKEY
By Edward E. Longan
ATTY.

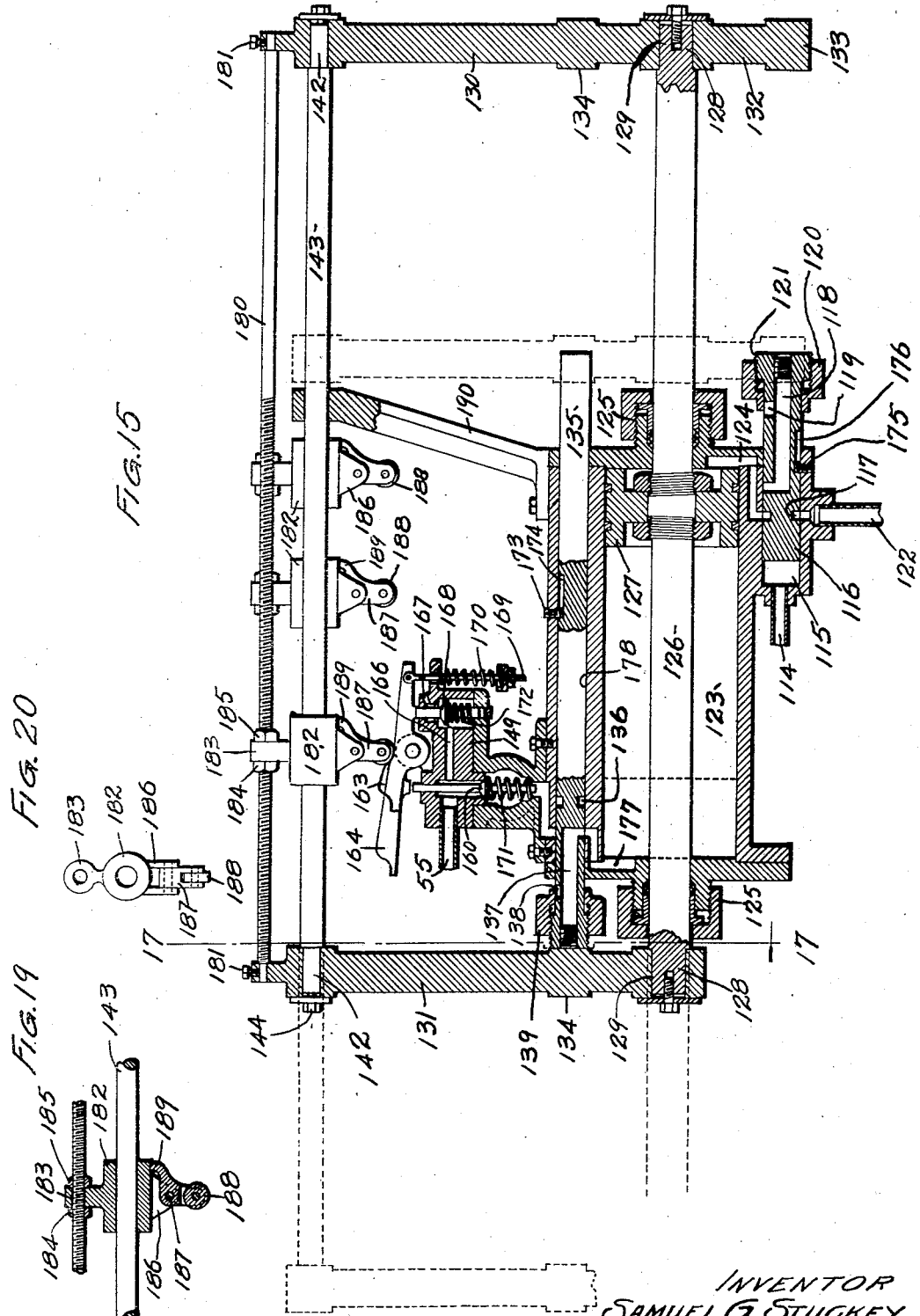

May 7, 1929.                S. G. STUCKEY                1,711,818
            IMPACT CONTROL FOR GLASS FEEDERS AND FORMING
             MACHINES, AND METHOD OF OPERATING THE SAME
                       Filed Dec. 18, 1926        7 Sheets-Sheet 6
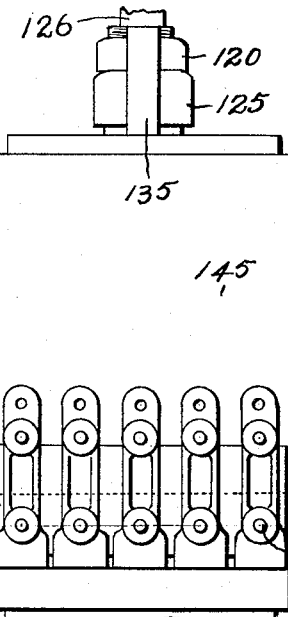
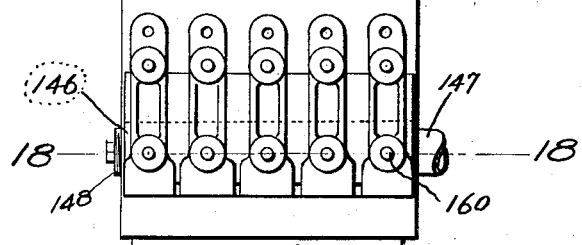
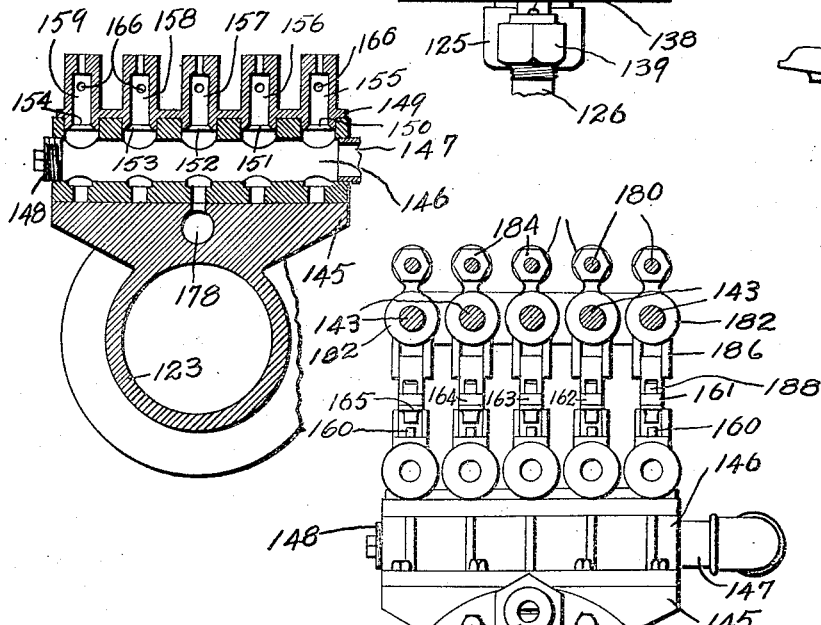
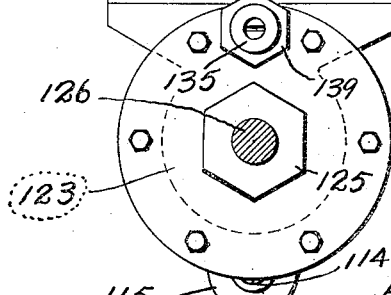
INVENTOR
SAMUEL G. STUCKEY
By Edward E. Longan
ATTY

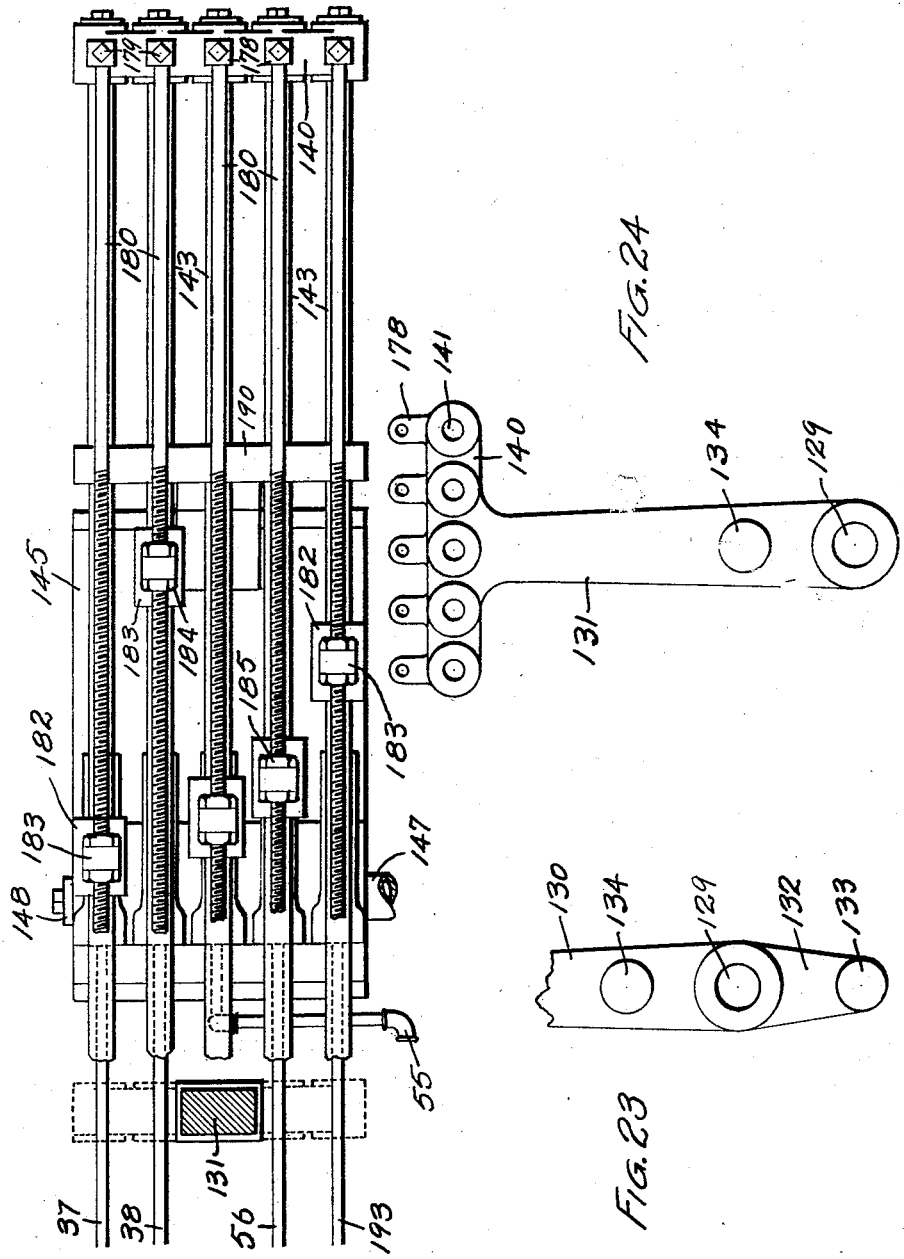

Patented May 7, 1929.

1,711,818

UNITED STATES PATENT OFFICE.

SAMUEL G. STUCKEY, OF EAST ST. LOUIS, ILLINOIS.

IMPACT CONTROL FOR GLASS FEEDERS AND FORMING MACHINES AND METHOD OF OPERATING THE SAME.

Application filed December 18, 1926. Serial No. 155,606.

My invention relates to improvements in impact control for glass feeders and forming machines, and method of operating the same, and has for its primary object a device by which the impact of the lower end of a descending column of glass automatically controls the operation of the feeding mechanism and also of the forming machine.

A further object is to construct an impact control for glass feeders by means of which the end of the descending column of glass, which enters into the gob, is automatically shaped, the descending end also placing in operation the mechanism by which the severing of the gob and the operation of the forming machine, which converts the gob into a finished article, is automatically controlled; the frequency of the various operations being governed entirely by the temperature, viscosity or fluidity of the glass in the gob.

A still further object is the method of controlling the feeding of glass and the operation of the forming machine automatically by regulating the length of the gob of glass which is to go into the finished article, the length of the gob and the rapidity at which this length is obtained controlling the operation of the feeder and the forming machine.

It is a well known fact that in the art of making glass articles where gobs are fed to a forming machine, there is a variation of weight of the gathering or gob in all types of feeders wherein the glass flows through a submerged orifice. Some of the causes for the variation of weight have been traced as follows:

First. A variation of the temperature of the glass within the discharge spout:

Second. A variation of the power that drives the feeder:

Third. Improperly operating valves, and also currents or slugs of colder glass within the delivery spout.

In the art of making glass gatherings a part of the process is to allow the glass to flow through the submerged orifice, either by gravity or to force it out and, if the temperature of the glass within the delivery spout, which feeds the glass to the orifice remains constant and the speed of the driving motor, which operates the feed mechanism, varies due to a rise or fall in the voltage of the electric current as delivered from the generator, there will be a change in weight as there will be a variable working against a constant. On the other hand if the speed of the motor operating the feed mechanism remains steady and there is a change in the temperature of the glass in the feed spout, there will again be a variable working against a constant and consequently a variation in the weight will result due to the fact that more or less glass will be extruded.

Another cause for the variation of the weight in a glass gathering or gob and one that cannot be corrected by any of the adjustments now provided is that portions of the glass within the feed spout will become colder than the majority of the glass. Part of this cold glass will eventually get into the stream passing through the orifice and have the effect of temporarily slowing down the stream, which passes through the orifice thus requiring a longer time to get the required weight.

Regarding the variations in temperature, it is well known that when the glass becomes hotter it will flow faster and consequently a greater amount of glass will flow through the orifice in a certain length of time producing a heavier gob than when the glass is in ordinary condition or of ordinary temperature, and to correct this a clay plug extends into the glass which acts as a valve and which must then be lowered to shut off some of the flow to take care of the increase in weight. This is the only adjustment provided for to govern the regulation of weight in feeders of the present type and necessitates very accurate work on the part of the operator so that the control of the weight above or below a mean temperature can be regulated in order to produce the proper size gob for a certain article because, if the gob is too light, the side walls of the finished article will be correspondingly thinned down, whereas if the gob is too heavy, they will be thickened. This gob weight regulating feature is especially essential in the manufacture of bottles which are designed to contain a predetermined amount of fluid.

By "mean temperature" is meant the temperature that will be right for the size of a perfect article to be made. Then if the feeder and the forming machine are speeded up to the point where the highest production is gained, it is necessary for the machine operator to constantly watch and make the adjustments to keep within certain limits of range of the mean temperature to keep up the production of the machine because, if this is not carefully watched, there will be many culls produced, which materially cuts down the production of the machine and, if the operator is working on piece work, his salary will be necessarily curtailed.

A study of the foregoing facts brings out that by automatically controlling the length of the glass gathering, which in effect means the weight of the gather, and to automatically correct the timing of the forming machinery and automatically correct the timing of the feeder for each gob, an apparatus must be used that will be operated by the impact of the lower end or portion of the glass gatherings as they issue from the orifice, whether it flows by gravity entirely or whether a portion thereof is forced out, and that when it has reached a predetermined length it must contact with the controlling mechanism thus starting and operating the forming machine and the feeder as a whole through the cycle of each gathering operation, and then stop or dwell until the impact of the next gathering. This impact, as aforesaid, will occur when the glass discharged through the orifice has elongated to a predetermined length; the time for this elongation necessarily depending upon the viscosity or temperature of the glass.

I am aware that several attempts have been made to regulate the feeder and the machine by flowing glass into a measuring cup, and when a predetermined weight was reached, the cup was intended to trip the machine and start it operating. This method was purely a weighing method and was not intended to operate by means of an impact from the glass. In other words, in these weighing machines the glass was gathered in a cup in which a large portion of its surface was contacted with and chilled thus making imperfect ware. Furthermore for each different sized article a separate cup had to be furnished, and in addition to this it was impossible to shape the end of the gathering so that it could be used for ware having a small neck, such as medicine bottles and the like.

I have also discovered that it is a well known fact in the glass art that in feeding glass through a submerged orifice the glass, which has been in contact with the wall of the feeder spout, becomes chilled or, in other words, its temperature is lower than that in the center of the spout. This glass at times breaks away from the wall and passes through the orifice in, what is termed in the glass art, "cold slugs" and during its passage through said orifice slows up the production of a complete gob or mold charge. This requires constant watching on the part of the operator in order to get gobs of uniform weight as the speed of the forming machine and the severing of the gob remains constant in all of the structures employed at the present time for gob feeding. In other words, no provision is made in the present feeders to take care of this temporary variation in weight in a gob occasioned by the fluidity or viscosity of the glass being fed.

By the use of my device I am assured of having all of the severed gobs of equal length regardless of the fluidity or viscosity of the glass and all of the operations, which commence with the impact of the gob and end with the discharge of the finished article, are automatically controlled by the time which it takes for the gob to form, that is by the fluidity or viscosity of the glass, so that if a slug of cold glass passes through the discharge orifice thus slowing up the production of the gob, the entire mechanism up to the finished article will be automatically slowed down and if the glass in the discharge spout should attain a greater fluidity than is really required, the mechanism will be automatically speeded up. In this way the machine operator is relieved of a lot of responsibility. In fact it is only necessary for him to tend to the heating jets which control the fluidity of the glass in the discharge spout so that the glass, which is finally delivered to the forming machine is not too hot, but as to slugs of cold glass passing through the orifice and consequently slowing up the delivery of the glass, no attention whatsoever need be paid thereto by the operator.

My device in addition to the above can also be regulated as to absolutely control the shape of the gob produced and the various parts of the device, that is the production of the gob, the shearing and the operation of the forming machine can be adjusted and timed to suit various conditions which may arise. The changing of timing of the various operations can be accomplished while the device is in operation so that the effect of each change can be readily noted as the articles are being formed, it being unnecessary to stop the machine to make any changes in the timing of the various parts.

In the drawings:

Fig. 1 is a front view of my device showing the same connected to a feeder, parts being broken away and parts in section;

Fig. 2 is a top plan view of the same;

Fig. 3 is a top plan view of the controller arms and the parts intimately associated therewith with parts broken away and in section;

Fig. 4 is a side elevation of the same;

Fig. 5 is a cross section taken on the line 5—5 of Fig. 3;

Fig. 6 is an enlarged view showing the manner in which the controlling arms are pivoted;

Fig. 7 is an enlarged view of one of the controlling arms;

Fig. 8 is an enlarged horizontal section taken on the line 8—8 of Fig. 4;

Fig. 9 is a vertical cross section taken on the line 9—9 of Fig. 8;

Fig. 10 is an enlarged view of the controller arm support;

Fig. 11 is a vertical section of the impact end of the controller arms showing one form of end shape of the gob;

Fig. 12 is a similar view showing another form of end shape;

Fig. 13 is a similar view showing still another form;

Fig. 14 is a similar view showing still another form;

Fig. 14ª is a view illustrating the manner of shaping the entire gob;

Fig. 15 is an enlarged vertical section of the master cylinder and the valves controlled thereby;

Fig. 16 is a top plan view of the master cylinder with the valves and their operating mechanism removed;

Fig. 17 is a vertical section taken on the line 17—17 of Fig. 15;

Fig. 18 is a vertical cross section taken on the line 18—18 of Fig. 16;

Fig. 19 is a section of one of the tripping dogs showing the manner of mounting the contact roller therein;

Fig. 20 is an end view of one of the tripping dogs;

Fig. 21 is a side elevation of one of the short rocker arms;

Fig. 22 is a top plan view of the master cylinder with portions broken away and in section illustrating the position of the various tripping dogs;

Fig. 23 is a fragmental view of the lower end of one of the rod supports; and

Fig. 24 is a face view of the other rod support.

In the construction of my device an ordinary glass melting furnace is used which has a feed spout 30. This feed spout is in constant communication with the interior of the furnace and is arranged to have a predetermined level of molten glass therein. This construction is common to all glass furnaces which have feed spouts and, therefore, will not be shown or described in detail. In the bottom of the feed spout is located a bushing 31 which has a discharge opening therethrough. The discharge opening in this bushing can be made of various sizes and the bushing is changed accordingly to the sized ware to be made.

Extending through the top of the said spout and in vertical alignment with the bushing and the outlet opening therethrough is a feed plunger or tube 32. In the illustration of this device I have illustrated the feed tube, which is embodied in my applications Serial No. 118,915 filed June 14, 1926 and Serial No. 106,935 filed May 15, 1926, it being understood, of course, that I may use other devices for feeding the glass from the furnace than that disclosed without departing from the spirit of my invention.

In the structure disclosed the plunger or tube 32 is hollow as at 33. Through the upper end of the tube 32 is attached a pipe 34, which, in turn, is attached to the upper end of a cylinder 35. In this cylinder is located a piston which moves up and down and alternately creates a plus or minus pressure in the tube 32 thus alternately pushing out glass through the opening in the bushing 31 and then drawing it back and drawing in a charge of fresh glass from the spout.

The piston which is located in the cylinder 35 is moved up and down by means of a piston located in the air cylinder 36. This cylinder has attached thereto air pipes 37 and 38. These air pipes have check valves 39 and 40 located therein. The tube 32 is adjusted up and down by means of a regulating screw 40. This regulating screw is carried by a bracket 41 which is carried by the harness 42 which supports the feed spout.

Extending from the harness 42 is a bracket 43 through which a feed screw 44 passes. This feed screw is provided with a key-way 45 which prevents it turning in the bracket 43. The feed screw is raised and lowered by means of nuts 46 and 47. These nuts in addition to raising and lowering the feed screw also serve to lock it in adjusted position.

Carried by the lower end of the feed screw 44 is a plate 48 which is provided with a boss 49 on which is secured the shears 50, the shears illustrated having scissor-action and have links 51 and 52 attached to their rear ends. These links in turn are connected to a piston rod 53 which rod in turn is secured to a piston mounted in the cylinder 54. The cylinder 54 has air lines or pipes 55 and 56 attached to its opposite ends so that the piston rod 53 can be moved forward and backward. The pipes 55 and 56 are provided with check valves 57 and 58 by means of which the speed of the piston in the cylinder 54 can be controlled.

Extending from the harness 42 is a bracket 57 through which an adjusting screw 58 extends. This screw is provided with a key-way 59 which is so arranged as to prevent the screw from turning in the bracket, the screw 58 is raised and lowered by means of nuts 60 and 61, these nuts operating in the same manner as the nuts 46 and 47.

To the lower end of the screw 58 is attached a yoke 62. This yoke has a plate 63 integral with its lower end. Extending through the sides 64 of the yoke 62 are pointed screws 65 which are held against accidental turning by means of locking nuts 66. These screws are preferably of hardened steel and are provided with conical ends 67. These conical ends are adapted to be seated in a conical recess 68 which is formed in the plate 69.

The plates 69 are seated in recesses 70 formed in the side walls of the controller arm support 72. The bottom of the controller support is provided with a boss 73 which is provided with an opening 74 Fig. 10 in which the pivot 75 for the controller arms 76 and 77 is secured. The bottom of the support 72 is also provided with a rearwardly extending arm 78 which is provided with a plurality of openings 79 so that a rod 80 can be passed therethrough. This rod carries a counterbalance weight 81 which is for the purpose of counterbalancing the front end of the controller arms. The projection 78 is also provided with an upwardly extending V shaped projection 82 which fits between the rear ends 83 and 84 of the controller arms and is for the purpose of assuring the controller arms being aligned every time they close so that the arms cannot swing about the pivot point and bring the forward ends of the arms out of alignment with the discharge orifice in the bottom of the feed spout.

The forward ends of the arms 76 and 77 are provided with cups 85. These cups are semi-circular and have their bottom provided with a semi-circular bottom 86. Through the side walls of the cups are formed openings 87 through which pins 88 extend. These pins carry semi-circular impact plates 89. These plates are preferably formed of graphite as this will stand an immense amount of heat and still not cause the glass to adhere thereto. Furthermore glass coming in contact with graphite does not seem to chill and become marked as when it comes in contact with any other substance.

Projecting forward from the plate 63 is a projection 90 through which is screw seated a thumb screw 91. The thumb screw 91 has secured to its upper end a plate 92, the purpose of which will be explained in detail later.

Carried by the arms 83 and 84, respectively, are studs 93 to which a coil spring 94 is secured. This coil spring is for the purpose of normally holding the impact plates together as illustrated in Fig. 3. The arms 83 and 84 are provided with projections 95 which are designed to contact with the spreader arms 96.

It will be noted from Fig. 3 that when the device is in closed position, the contact arms 96 do not contact with the projections 95. The purpose of this is to eliminate any possibility of impairing the sensitiveness of the device, that is, the tipping of the controlling arms, as these arms are set so as to tip under a very slight pressure and if the arms 96 are in constant contact, there would always be a possibility of sufficient friction being set up to impair the sensitiveness of the device.

The spreader arms 96 are carried by a yoke 97, which yoke is secured to the end of a piston rod 98, the piston rod being in turn carried by a piston located in the cylinder 99. The spreader arms are shaped as illustrated in Fig. 3 and contact on their inner edges with pins 100, which control the spreading action of the arms, and on their outer faces with pins 101, which tend to draw the arms back into the position illustrated in Fig. 3 when the piston in the cylinder 99 operates rearwardly.

Carried by the plate 63 is a guide 102 which has its outer end 103 upturned. The purpose of this guide is to swing the controlling arms back to a level as the same open and after they have been spread sufficiently to permit the gob of glass to pass therebetween so as to prevent any possibility of them tripping the pilot valve during the closing operation of the arms.

Carried by the plate 63 is a bracket 104 which supports the housing 105 of the pilot valve. This pilot valve has a valve stem 106 slidably mounted therein. The upper end of the valve stem is screw threaded as at 107, which is provided with knurled nuts 108 and 109 whereby the downward movement of the valve stem is controlled. The valve stem is also provided with a cutaway portion 110. The valve housing is provided with an inlet to which the pipe 111 is attached and with an outlet to which the pipe 112 is attached. These pipes are diametrically opposite each other and, when the valve stem is raised, permits, by reason of the cutaway portion 110, a free circulation of air. In other words the pipe 111 is attached to a source of air supply while the pipe 112 receives air from this supply when the valve is raised. The pipe 112 is connected to the cylinder 99 by means of the pipe 113 and when air is admitted through this pipe has a tendency to drive the piston rod 98 forward, causing the controller arms to be spread as indicated by dotted lines in Fig. 3. The pipe 112 also has attached thereto a pipe 114 which pipe terminates in the cylinder 115. In this cylinder is mounted a spool valve 116 which has a groove port 117 and an outlet port 118. The outlet port 118 is provided with an outlet opening 119, the size of which is controlled by means of the nut 120. This nut is mounted on the screw threaded end 121 of the spool valve 116. The operation of this will be explained in detail later.

Connected to the cylinder 115 is an air supply pipe 122, which is also connected to any suitable source of air supply, preferably the same one to which the pipe 111 is connected. The cylinder 115 communicates with one end of the master cylinder 123 by means of the port 124. The cylinder 123 is provided at each end with a suitable packing gland 125 by means of which the piston rod 126 is packed against leakage. The piston rod 126 has secured thereon a piston 127. This may be done either as shown in Fig. 15 by means of nuts, or any other suitable means may be employed. The piston rod 126 has its ends 128 reduced in diameter as illustrated in Fig. 15. The reduced ends pass into openings 129 formed in the rod carriers 130 and 131. The rod carrier 130 is provided with a downwardly extending portion 132, which is provided with a boss or pad 133. This boss or pad is designed to contact with the projecting end of the spool valve 116 for operating the same, as will hereinafter be described. The rod carriers 130 and 131 are provided with pads 134 which are designed to contact with a spool valve 135 at opposite ends of the stroke of the piston 127 and operate the same. The spool valve 135 is provided with a cutaway portion 136 and with the exhaust opening 137. The exhaust opening 137 is provided with an exhaust port 138 through which the amount of exhaust is controlled by means of the nut 139.

The upper end of the rod carriers 130 and 131 is provided with a T shaped extension 140 through which are formed openings 141. These openings receive the reduced ends 142 of the rods 143. The piston rod 126 and the rods 143 are secured to the rod carriers by means of screws or bolts 144 as illustrated in Fig. 15.

Carried by the master cylinder 123 is an extension 145 which is located along the top edge of the cylinder and to which is secured an air chamber 146. Air is admitted to this chamber at one end by means of a pipe connection 147 which is also attached to a suitable source of air supply. The opposite end of this air chamber is closed by means of a plug 148. Mounted on top of the air chamber 146 is a valve housing 149. This valve housing is provided with a plurality of projections which form the valve seats 150, 151, 152, 153 and 154 and which communicate with the ports 155, 156, 157, 158 and 159. These valve seats are closed by means of poppet valves 160. These valves are in turn controlled by rocker arms 116, 162, 163, 164 and 165, the rocker arms 163 and 164 being preferably shorter than the balance of the arms. The purpose of this will be explained in detail later.

The ports 155 to 159 inclusive communicate with exhaust ports 166. These ports communicate with ports 167, the passage between the ports 166 and 167 being controlled by means of poppet valves 168. It will be noted from Fig. 15 that the valves 168 are in unseated position when the valves 160 are seated. This is for the purpose of permitting the exhaust from the various parts, which these valves control, to pass back through the same pipe but at the same time the valves are so arranged that, when the valve 160 is unseated, the valve 168 will be closed thus preventing any escape of air through the exhaust port 167. In other words my device is so arranged that when any of the rocker arms are tripped so as to operate the valve 160, the valve 168 is closed and thereby a large amount of waste air is prevented.

The rocker arms are held normally in a position to keep the valves 168 open by means of a rod 169 and coil spring 170, while coil springs 171 are used to seat the valves 160 and coil springs 172 are used to normally hold or tend to seat the valves 168. The valve 135 is prevented from turning by means of a set screw 173 which fits in a groove 174 cut in the valve 135 while the set screw 175, which is seated in the groove 176, prevents the valve 116 from turning. This is essential because if these valves were permitted to turn, the passages 137 and 118 respectively would be brought out of alignment with the ports 124 and 177.

Projecting upward from the rod carriers 130 and 131 are projections 179 in which the ends of adjusting screws 180 are secured. These screws are prevented from turning by means of set screws 181. Slidably mounted on the rods 143 are tripping dogs 182 which have upwardly extending projections 183 through which the adjusting screws 181 pass, and carried by the adjusting screws and located on either side of the projections 183 are nuts 184 and 185 by means of which the dogs can be moved backward and forward and secured in adjusted position on the rods 143. The dogs 182 are each provided with downwardly projecting ears 186 between which is pivotally mounted a bifurcated member 187, the bifurcation of which carries a roller 188. The bifurcated member is also provided with a stop 189 which is designed to contact with the under surface of the dog 182. In this manner the roller 188 can tip in one direction but be held against movement in the other direction. The purpose of this will be explained in detail later.

The master cylinder is also provided with a rod support 190 which acts as a stiffener for the rods 143 and, not alone prevents their bulging upward when the dogs pass over the rocker arms, but also prevents the rod carriers 130 and 131 from swinging around with the piston rod 126. If this support were not present, there would always be a possibility of the rod carriers swinging around to such a position that the tripping dogs would not contact with the proper rocker arm, or, in fact, probably not contact with any of the arms.

Located below the outlet orifice is the mold table 190 of a forming machine which carries molds 191. The operation of this mold table is well known and it is operated step by step. This step by step movement is controlled by means of a master valve 192, which is connected to an air pipe 193, this air pipe operating the valve. The pipe 193 is provided with a regulating valve 194 by means of which the operation of the master valve just mentioned is controlled.

Connected to the pipe 193 is a pipe 195 which controls the rear movement of the piston in the cylinder 99 and consequently the closing of the controlling arms. It will be seen that from this construction, the operation of the various valves, which control the different parts of the machine, that is the formation of the gob, the shearing mechanism, and the operation of the mold table, are controlled entirely from the master cylinder and depend entirely on tripping of the pilot valve as will be fully hereinafter described in the operation of the machine.

While I have shown my device as automatically controlling the operation of a feeding mechanism, a shearing mechanism, and a forming machine, I wish it to be understood that my device can be employed with a feeder in which the stream flows constantly and the controlling device be operated to control a shearing mechanism only, or it may be connected to operate a forming machine also in the event that a continuously flowing stream of glass is found desirable.

The master cylinder 123, the valves carried thereby, and the means for operating the separate valves constitute, what I term, a master control for the entire device.

The operation of my device is as follows: We will assume that a gob is in the process of formation, that is its lower end is descending. During this time the position of the device will be as illustrated in Figs. 1 and 2, that is, the shears 50 will be open while the controlling arms will be in closed position with the impact plate directly in the path of descent of the gob. When in this position the valve 135 is in the position shown in Fig. 15 while the valve 116 is so moved that its exhaust port is in communication with the port 124. The tripping dogs have been previously adjusted as shown in Fig. 22. As the gob continues to descend, its end will come in contact with the impact plate causing it to move down into the position illustrated by dotted lines in Fig. 4. This downward movement causes the end of the arm 83 to move upward and contact with the valve stem 106, raising this valve and permitting air to pass from the pipe 111, which, as aforementioned, is in communication with a constant source of air supply and permits this air to pass through the pipes 112 and 113 and into the cylinder 99, moving the piston rod 98 forward and in so doing pushing the spreader arms 96 forward.

It will be noted from Fig. 3 that these arms have their inner edge curved so that as the arms are moved forward they will spread. This spreading moves the arms 83 and 84 apart and simultaneously spreads the arms 76 and 77 thus moving the impact plate in halves away from the gob. The air which passes through the pipe 112 also passes through the pipe 114 and enters the cylinder 115, moving the valve 116 forward so that the port 117 will communicate with the port 124 and also with the air supply pipe 122 permitting air to pass therefrom through the port 124 to the face of the piston 127. This causes the piston to move longitudinally in the cylinder and permits the air on the opposite face of the cylinder to escape through the port 177 out through the passage 137 and through the exhaust port 138, the opening of which controls the speed at which the piston travels and this opening is regulated, as aforesaid, by means of the nut 139.

As the piston moves forward, it necessarily carries with it the piston rod 126 and also the rod carriers 130 and 131 together with the tripping dogs 182. The tripping dogs are so adjusted on the rods that, as soon as the device commences to move forward, the rocker arm 165 is depressed by the tripping dog immediately above it, closing the valve 168 and opening the valve 160, that is unseating it from the seat 154 thus permitting air to enter the pipe 37. This would place the air cylinder 36 in operation and cause a suction to be created in the feed tube 32. This suction creates an intrusive movement to the descending glass, that is, it commences to draw it up.

Immediately after this suction has been started, the rocker arm 163 is tripped, unseating the air supply valve thereunder and permitting air to pass through the pipe 55 to the rear of the shear cylinder, driving forward the piston rod 53 and causing the shears to close and sever the gob.

As soon as the shears have been closed, the rocker arm 162 is contacted with by the tripping dog immediately above it, causing air to pass through the pipe 56 to the forward end of the shear cylinder, withdrawing the piston rod 53 and causing the shears to open. A continued movement of the piston 127 next causes a dog to trip the rocker arm 161 thereby admitting air to the pipe 193 from where the air passes into the master valve 192 on the forming machine. This valve sets the various parts of the forming machine in operation, among which being to remove the blank mold which has just received the severed charge and bring another mold in position to receive the succeeding charge.

Simultaneously with the passage of air through the pipe 193, air also enters the pipe 195, causing the piston rod 98 to be withdrawn thus drawing the spreaders 96 backward and, by reason of the pins 101, these arms are brought back to their starting position and simultaneously with this the controlling arms are again closed by reason of the spring 94, it being understood, of course, that, during the spreading of the arms, the end 83 rides under the upturned end 103 of the guide 102 and assists the weight 81 in restoring the controlling arms back to a level. This is essential because if the arms were not brought back to a level before closing, they would strike the lower end of the valve stem 106 and thus throw the entire device out of operation.

After this has occurred, the rod carrier 130 has assumed the position shown by dotted lines in Fig. 15 and in so doing has moved the valve 135 forward so that the port 136 is in communication with the port 177 and also with the air chamber 146 permitting the piston to move backward. The end 133 has also contacted with the valve 116 and moved it so that its exhaust port will be in alignment with the port 124 permitting the air to exhaust from the cylinder through the outlet opening 119, the size of which is controlled by the adjusting nut 120 so that the speed of return to the starting position of the master cylinder can be controlled.

After the master cylinder has reached its outermost or starting position, the rod carrier 131 contacts with the opposite end of the valve 135 and again places it in exhausting position when the previously described cycle of operations is ready to commence again.

It will be noted from Fig. 15 that when the valve 160 is closed, the valve 168 is open so that the device to which this particular valve is attached can exhaust directly back through the pipe which supplied the driving power.

It will also be noted from Figs. 1 and 2 that each of the feed lines or pipes are supplied with check valves so that the speed at which the air exhausts therethrough can be controlled and thus control the various speeds of operation of the parts to which these pipes lead.

While I have shown my device as controlling an air feeder, a rotating table forming machine and a scissor-like shear, I do not desire to limit myself thereto as the controlling mechanism can be connected to any of the commercial types of feeders, forming machines and severing devices now on the market without departing from the spirit of my invention.

While I have described my device as being extremely sensitive and tipping almost at the moment that the glass contacts with the impact plate, I may, if desired, increase the weight 81 so that the controller arm will stop the descending end of the gob an appreciable length of time. In this way the glass descending will have a tendency to swell or bulge out between the outlet orifice in the discharge spout and the impact plate as in Fig. 14ª. In this manner and by reason of the various shapes of recesses in the impact plates, I am enabled to make almost any desired shape of gob that is required in making different kinds of ware, and this without the necessity of adjusting the timed relation of one part of the feeder relative to another part.

Having fully described my invention, what I claim is:—

1. An impact control comprising in combination with means for producing successive feeds of molten glass and means for severing mold charges therefrom, of an air driven master control for placing said feeding and severing means in operation, a pilot valve adapted to place said master control in operation, and means adapted to be operated by the impact of the descending feed for operating said pilot valve.

2. An impact control comprising in combination with means for producing successive intermittent downward feeds of molten glass and means for intermittently severing mold charges therefrom, of a master control for placing said feeding and severing means in operation, a pilot valve adapted to place said master control in operation, means adapted to be operated intermittently by the impact of the descending feed of glass for operating said pilot valve, and means for adjusting said impact means up and down whereby the length of the feeds can be regulated.

3. An impact control comprising in combination with means for producing successive downward feeds of molten glass from a container and means for severing mold charges therefrom, of a master control for placing said feeding and severing means in operation, means including a pilot valve for placing said master control in operation, means adapted to be operated by the impact of the descending feed for operating said pilot valve, and adjustable means carried by said master control whereby the time of operation of the severing means and feeding means may be varied.

4. An impact control comprising in combination with means for producing successive downward feeds of molten glass and means for severing mold charges therefrom, of an air operated master control for placing said feeding and severing devices in operation, a pilot valve adapted to place said master control in operation in one direction, means for reversing said master control, means adapted to be operated by the impact of the descending feed for operating said pilot valve, means for adjusting said impact means up and down whereby the length of the feeds can be regulated, and means carried by said master control whereby the time of operation of the severing means and feeding means may be varied.

5. An impact control comprising the combination with a gob feeder, a severing mechanism, a glass forming machine, and an air operated master control for placing the same in operation, of a pilot valve for placing said master control in operation in one direction, means for automatically reversing said master control, an impact means located between the feeder and the forming machine and adapted to be contacted with and tilted by contacting with the descending end of a mold charge whereby said pilot valve is operated, and means controlled by said pilot valve for removing said impact means from the path of the descending mold charge after having been contacted with and tilted.

6. An impact control comprising a pair of arms pivoted intermediate their ends to a support, a sectional impact plate carried at one end of said arms, a pivotal mounting for said support, a pilot valve mounted above the opposite end of one of said arms and adapted to be opened when the arms are tilted by contact with the end of a descending stream of glass, means operated by said valve for spreading said arms so as to remove said impact plate from the path of the descending stream of glass, a master control adapted to be placed in operation in one direction by said pilot valve simultaneously with the spreading of said arms, and means for automatically reversing the direction of movement of the master control.

7. An impact control comprising in combination with means for producing successive feeds of molten glass and means for severing mold charges thereof, of a master control for placing said feeding and severing devices in operation, a pilot valve adapted to place said master control in operation in one direction, tilting means automatically operated by the impact of the descending end of a feed of glass to place the pilot valve in operation, and means for automatically returning said master control to its starting position.

8. An impact control comprising the combination with means for intermittently creating a descending stream of glass, of a severing means for cutting mold charges therefrom, and means adapted to be tilted by impact with the descending end of said stream for placing said severing means in operation at predetermined intervals.

9. An impact control comprising the combination with means for severing mold charges from a flowing stream of glass, of a pilot valve for controlling the operation of said severing means, and means adapted to be tilted by impact imparted thereto by the descending end of said stream for tilting the same thereby placing said pilot valve in operation.

10. An impact control comprising the combination with means for severing mold charges from a flowing stream of glass, of a pilot valve adapted to operate said severing means, means adapted to offer resistance to and be operated by the impact imparted thereto by the descending end of said stream for placing said pilot valve in operation, and means for varying the resistance to said impact.

11. An impact control comprising the combination with means for severing mold charges from a constantly flowing stream of glass, of a pilot valve for controlling the operation of said severing means, and means adapted to be operated and tilted by impact with the descending end only of said stream for placing said pilot valve in operation.

12. An impact control comprising the combination with means for severing mold charges from a constantly flowing stream of glass, of a pilot valve adapted to operate said severing means, means adapted to be operated by impact with the descending end only of said stream for placing said pilot valve in operation, and means for varying the sensitiveness of the impact means to the impact necessary to tilt the same.

13. An impact control comprising the combination with means for severing mold charges from a flowing stream of glass, of means adapted to be tilted by impact with the descending end only of said stream for placing said severing means in operation, and means for raising and lowering said impact means for regulating the length of the mold charges.

14. An impact control comprising the combination with means for severing mold charges from a flowing stream of glass, of means adapted to be tilted by impact with the descending end only of said stream for placing said severing means in operation, means for raising and lowering said severing means, and means for regulating the sensitiveness of said impact means to tilting.

15. An impact control comprising the combination with means for severing mold charges from a flowing stream of glass, of means adapted to be tilted by impact with the descending end of said stream for placing said severing means in operation, and means for independently adjusting said impact means and severing means to and from each other.

16. An impact control comprising the combination with a severing means, a gob feeder, a forming machine and a master control for placing said devices in operation, of a pilot valve for placing said master valve in operation in one direction, means for reversing the operation of said master control automatically, and a controlling mechanism adapted to be operated by impact with the end only of a gob of glass while the same is being fed downward for operating said pilot valve whereby the frequency of operation of the various mechanism are automatically controlled by the viscosity of the glass.

17. The combination in an apparatus for feeding molten glass periodically in successive downwardly directed, compact masses, of periodically operating shears for successively severing a mold charge from each mass, and means controlled by the viscosity of the glass for automatically varying the frequency of the shearing operation when contacted with by the end of a descending stream of glass.

18. An apparatus for separating molten glass into mold charges including a container for the glass having an outlet below the surface of the glass, means for periodically accelerating and retarding the discharge of molten glass through the outlet, severing means beneath the outlet operating in timed relation to the accelerating and retarding means for severing a predetermined length of the discharged glass, and means automatically operated by a predetermined length of discharged glass for regulating the accelerating and retarding means and the frequency of the cutting operation.

19. The herein described method of severing successive gobs of glass of varying lengths from a constantly flowing stream, which consists in placing an obstruction in the path of travel of said stream, causing said stream to contact with said obstruction thereby controlling the operation of a severing means, and simultaneously with said contact removing said obstruction.

20. The herein described method of severing successive gobs of glass of varying weight from a constantly flowing stream, which consists in placing an impact control in the path of travel of said stream, controlling the operation of a severing means by contact of the descending end of the stream of glass, and automatically removing said impact control immediately after such contact.

21. The herein described method of delivering mold charges to the mold of a forming machine, which consists in establishing a downward flow of glass, causing said downward flow of glass to contact with an impact control, and simultaneously therewith preshaping the end of said flow causing said impact to trip said impact control, removing said impact control from the path of travel of said stream and then severing a predetermined length of glass from said flow.

22. The herein described method which consists in producing a downward feed of molten glass from an outlet orifice utilizing the impact of the descending end of said feed when a predetermined length has been reached for placing an air driven master control in operation in one direction thereby controlling the operations of a glass machine and automatically returning said master control to its starting position when a glass gather has been obtained.

23. The herein described method of controlling the operations of a glass feeder, a severing means, and a glass forming machine, which consists in establishing a downward feed of glass, interposing an obstruction in the path of travel of said glass, and utilizing the impact of the descending end of said glass with said obstruction to place the several mechanisms in operation and simultaneously therewith removing said obstruction.

24. The method of feeding mold charges to the mold of a forming machine which consists in establishing a downward feed of molten glass, placing a removable obstruction in the path of said glass, utilizing the impact of the lower portion of said feed for placing a severing means in operation whereby a predetermined constant length of mold charge is automatically maintained, removing said obstruction immediately after having received the impact, and then restoring said obstruction to its original position when a mold charge has been severed.

25. The method of delivering mold charges of uniform length to the molds of a forming machine, which consists in placing an obstruction in the path of a descending stream of glass, utilizing the impact of the lower portion of a descending stream of glass to place a severing means located at a predetermined distance above said end in operation whereby the operation of said severing means is automatically varied according to the time required for the severed end of the stream to reach said obstruction, and removing said obstruction as soon as the severing means commences to operate.

In testimony whereof I have affixed my signature.

SAMUEL G. STUCKEY.